(12) United States Patent
Matsushima et al.

(10) Patent No.: US 8,186,707 B2
(45) Date of Patent: May 29, 2012

(54) KNEE AIRBAG DEVICE FOR A VEHICLE

(75) Inventors: Hitoshi Matsushima, Aichi (JP);
Osamu Fukawatase, Aichi (JP)

(73) Assignee: Toyota Jidosha Kabushiki Kaisha,
Toyota-shi, Aichi-ken (JP)

( * ) Notice: Subject to any disclaimer, the term of this patent is extended or adjusted under 35 U.S.C. 154(b) by 0 days.

(21) Appl. No.: 12/676,958

(22) PCT Filed: Dec. 18, 2008

(86) PCT No.: PCT/JP2008/073095
§ 371 (c)(1),
(2), (4) Date: Mar. 8, 2010

(87) PCT Pub. No.: WO2010/023772
PCT Pub. Date: Mar. 4, 2010

(65) Prior Publication Data
US 2011/0241320 A1    Oct. 6, 2011

(30) Foreign Application Priority Data
Aug. 26, 2008  (JP) ................................. 2008-216557

(51) Int. Cl.
*B60R 21/206* (2011.01)
*B60R 21/2338* (2011.01)
(52) U.S. Cl. ................... 280/730.1; 280/743.2; 280/753
(58) Field of Classification Search .................. 280/729, 280/730.1, 743.1, 743.2, 752, 753
See application file for complete search history.

(56) References Cited

U.S. PATENT DOCUMENTS

| 6,155,595 A | 12/2000 | Schultz |
| 6,283,500 B1 * | 9/2001 | Eckert et al. ............... 280/730.1 |

(Continued)

FOREIGN PATENT DOCUMENTS

EP    684 164 A1    11/1995

(Continued)

OTHER PUBLICATIONS

"Notice of Reasons for Rejection," in Japanese Application No. 2008-216557, filed Aug. 26, 2008 (Mailing Date: Mar. 24, 2009).

(Continued)

*Primary Examiner* — Joseph Rocca
(74) *Attorney, Agent, or Firm* — Finnegan, Henderson, Farabow, Garrett & Dunner, LLP

(57) ABSTRACT

In a knee airbag device for a vehicle, which has upper and lower tethers that extend in a vehicle width direction and regulate a bag thickness of an airbag, and in which gas from an inflator is supplied between the upper and lower tethers, it is aimed to make a flow of the gas toward an upper portion and a lower portion from between the upper and lower tethers at the inside of the knee airbag smoother, and to improve deployability of the knee airbag in a vehicle vertical direction. Upper and lower tethers 16 and 18 are arranged to be separated from each other in the vehicle vertical direction and are formed so that a vertical clearance therebetween increases approaching both vehicle width direction end portions 16A and 18A thereof. When the gas is supplied between the upper and lower tethers 16 and 18, the gas spreads to both vehicle width direction sides along the tethers 16 and 18 and smoothly moves around into an upper portion 14A and a lower portion 14B of a knee airbag 14 from both of the end portions 16A and 18A of the tethers 16 and 18.

6 Claims, 8 Drawing Sheets

U.S. PATENT DOCUMENTS

| | | | |
|---|---|---|---|
| 6,547,279 B1 * | 4/2003 | Amamori | 280/743.1 |
| 6,705,638 B2 | 3/2004 | Abe et al. | |
| 7,147,247 B2 | 12/2006 | Hayakawa | |
| 7,261,318 B2 | 8/2007 | Enders | |
| 2002/0096869 A1 | 7/2002 | Kai et al. | |
| 2002/0135164 A1 * | 9/2002 | Thomas | 280/732 |
| 2002/0171232 A1 | 11/2002 | Abe | |
| 2003/0168836 A1 | 9/2003 | Sato et al. | |
| 2005/0006880 A1 | 1/2005 | Nakayama | |
| 2005/0116449 A1 * | 6/2005 | Enders | 280/730.1 |
| 2005/0189741 A1 * | 9/2005 | Abe et al. | 280/730.1 |
| 2008/0106078 A1 | 5/2008 | Fukawatase et al. | |

FOREIGN PATENT DOCUMENTS

| | | |
|---|---|---|
| EP | 1 544 054 A2 | 6/2005 |
| JP | 11-321539 | 11/1999 |
| JP | 2002-220022 | 8/2002 |
| JP | 2002-356137 | 12/2002 |
| JP | 2003-175793 | 6/2003 |
| JP | 2003-220920 | 8/2003 |
| JP | 2003-335208 | 11/2003 |
| JP | 2005-29102 | 2/2005 |
| JP | 2005-96625 | 4/2005 |
| JP | 2005-186887 | 7/2005 |
| JP | 2006-159970 | 6/2006 |
| JP | 2007-45241 | 2/2007 |
| JP | 2007-161090 | 6/2007 |
| JP | 2007-302063 | 11/2007 |
| JP | 2008-114701 | 5/2008 |

OTHER PUBLICATIONS

Extended European Search Report for EP Appl. No. 08876831.2 dated Feb. 24, 2012.

* cited by examiner

KNEE AIRBAG DEVICE FOR A VEHICLE

CROSS-REFERENCE TO RELATED APPLICATIONS

This application is a national phase application of International Application No. PCT/JP2008/073095, filed Dec. 18, 2008, and claims the priority of Japanese Application No. 2008-216557, filed Aug. 26, 2008, the contents of both of which are incorporated herein by reference.

TECHNICAL FIELD

The present invention relates to a knee airbag device for a vehicle.

BACKGROUND ART

In a knee protection device for a vehicle passenger that is arranged to correspond to a height position of a knee portion of a seated occupant, as a connection means that connects facing portions of a wall of an airbag, a structure wherein partition walls are provided above and below in the airbag, and a gas generator (inflator) for causing the airbag to expand is provided at a height position located between the upper and lower partition walls, has been disclosed (refer to Patent Document 1). Further, in a knee airbag device equipped with a column, with regard to a plurality of straps that link an instrument panel side foundation cloth and an occupant side foundation cloth of a knee airbag, a structure wherein a vehicle front-rear direction dimension of a strap at a vehicle upper side is set to be larger than the similar-width dimension of a vehicle lower side strap, and an inflator is provided between the upper and lower straps, has been disclosed (refer to Patent Document 2).

Patent Document 1: Japanese Patent Application Laid-Open (JP-A) No. 11-321539
Patent Document 2: Japanese Patent Application Laid-Open (JP-A) No. 2008-114701

DISCLOSURE OF THE INVENTION

Problems to be Solved by the Invention

However, in the aforementioned conventional examples, the partition walls and straps (tethers) that regulate a bag thickness at the time of deployment is configured in a linear shape that extends in the vehicle width direction as seen from the occupant side, and when the gas is supplied between the upper and lower partition walls or the like from the inflator, after the gas spreads to both vehicle width direction sides along the partition walls or the like, it flows around into each of an upper portion and a lower portion inside the airbag from both vehicle width direction end portions of the partition walls or the like. As a result, deployment of the airbag in the vehicle vertical direction lags behind deployment in the vehicle width direction, and thus, it has been difficult to accommodate differences in height position of a knee portion due to the body type of an occupant.

In consideration of the above-described circumstances, the present invention aims to make the flow of gas to an upper portion and a lower portion from between upper and lower tethers at the inside of a knee airbag smoother, and to improve the deployability of the knee airbag in a vehicle vertical direction, in a knee airbag device for a vehicle which has upper and lower tethers that extend in a vehicle width direction and regulate a bag thickness of the airbag, and in which gas from an inflator is supplied between the upper and lower tethers.

Means for Solving the Problems

A first aspect of the present invention comprises a knee airbag that is placed in a folded-up state before a collision and configured to be able to receive a supply of gas and expand and deploy toward the side of a knee portion of an occupant at the time of a collision of a vehicle; upper and lower tethers that are each provided to extend in a vehicle width direction at the inside of the knee air bag, arranged to be separated from each other in a vehicle vertical direction, configured to be able to regulate a bag thickness of the knee airbag at the time of expansion and deployment, and formed so that a vertical clearance therebetween increases approaching both vehicle width direction end portions thereof; and an inflator that is able to eject gas to supply the gas between the upper and lower tethers at the inside of the knee airbag at the time of the collision of the vehicle.

In the knee airbag device for a vehicle according to the first aspect of the present invention, at the time of a collision of the vehicle, the gas is ejected from the inflator, and the gas is supplied between the upper and lower tethers at the inside of the knee airbag. Since the upper and lower tethers are each provided to extend in the vehicle width direction at the inside of the knee air bag, arranged to be separated from each other in the vehicle vertical direction, and formed so that the vertical clearance therebetween increases approaching both of the vehicle width direction end portions thereof, the gas that is supplied between the upper and lower tethers spreads to both vehicle width direction sides along the tethers and smoothly moves around into an upper portion and a lower portion of the knee airbag from both of the end portions of the tethers. Accordingly, deployment of the knee airbag in the vehicle vertical direction can be inhibited from lagging behind deployment in the vehicle width direction.

As a result, in the knee airbag device for a vehicle according to the first aspect of the present invention, the flow of gas to the upper portion and the lower portion from between the upper and lower tethers at the inside of the knee airbag can be made smoother, and the deployability of the knee airbag in the vehicle vertical direction can be improved, in a knee airbag device for a vehicle which has upper and lower tethers that extend in a vehicle width direction and regulate a bag thickness of the airbag, and in which gas from an inflator is supplied between the upper and lower tethers.

According to a second aspect of the present invention, in the knee airbag device for a vehicle according to the first aspect, both of the end portions of the upper side tether curve or incline toward a vehicle upper side, and both of the end portions of the lower side tether curve or incline toward a vehicle lower side.

In the knee airbag device for a vehicle according to the second aspect of the present invention, since both of the end portions of the upper side tether curve or incline toward the vehicle upper side, and both of the end portions of the lower side tether curve or incline toward the vehicle lower side, it is easy for the gas that has been supplied between the upper and lower tethers at the time of a collision of the vehicle to move around into the upper portion and the lower portion in the knee airbag. As a result, the flow of gas to the upper portion and the lower portion from between the upper and lower tethers at the inside of the knee airbag can be made smoother, and the deployability of the knee airbag in the vehicle vertical direction can be improved, by way of a simple configuration.

According to a third aspect of the of the present invention, in the knee airbag device for a vehicle according to the first or second aspect, the lower side tether is set to be shorter in the vehicle width direction than the upper side tether.

In the knee airbag device for a vehicle according to the third aspect of the present invention, since the lower side tether is set to be shorter in the vehicle width direction than the upper side tether, the gas that has been supplied between the upper and lower tethers at the time of a collision of the vehicle flows into the lower portion of the knee airbag at a faster timing than it does into the upper portion. Therefore, the lower portion of the knee airbag can be caused to deploy even more rapidly. Furthermore, as a result, even in a case where a body type of the occupant is small and the height position of a knee portion thereof is low, or in a case where the knee portion is close to a knee airbag accommodation portion, the knee portion can be appropriately restrained.

According to a fourth aspect of the of the present invention, in the knee airbag device for a vehicle according to any one of the first to third aspects, the knee airbag is folded up and accommodated within a glove box door constituting an occupant side outer wall of a glove box of the vehicle.

In the knee airbag device for a vehicle according to the fourth aspect of the present invention, since the knee airbag is folded up and accommodated within the glove box door constituting the occupant side outer wall of the glove box of the vehicle, the knee airbag can be rapidly deployed between the knee portion of the occupant and the glove box door at the time of a collision of the vehicle. As a result, the restraining ability with respect to the knee portion of the occupant can be further enhanced.

Effects of the Invention

As explained above, according to the knee airbag device for a vehicle according to the first aspect of the present invention, an excellent effect is obtained in that the flow of gas to the upper portion and the lower portion from between the upper and lower tethers at the inside of the knee airbag can be made smoother, and the deployability of the knee airbag in the vehicle vertical direction can be improved, in a knee airbag device for a vehicle which has upper and lower tethers that extend in a vehicle width direction and regulate a bag thickness of the airbag, and in which gas from an inflator is supplied between the upper and lower tethers.

According to the knee airbag device for a vehicle according to the second aspect of the present invention, an excellent effect is obtained in that the flow of gas to the upper portion and the lower portion from between the upper and lower tethers at the inside of the knee airbag can be made smoother, and the deployability of the knee airbag in the vehicle vertical direction can be improved, by way of a simple configuration.

According to the knee airbag device for a vehicle according to the third aspect of the present invention, an excellent effect is obtained in that, even in a case where a body type of the occupant is small and the height position of a knee portion thereof is low, or in a case where the knee portion is close to a knee airbag accommodation portion, the knee portion can be appropriately restrained.

According to the knee airbag device for a vehicle according to the fourth aspect of the present invention, an excellent effect is obtained in that the restraining ability with respect to the knee portion of the occupant can be further enhanced.

BEST MODE FOR IMPLEMENTING THE INVENTION

Figure 1:
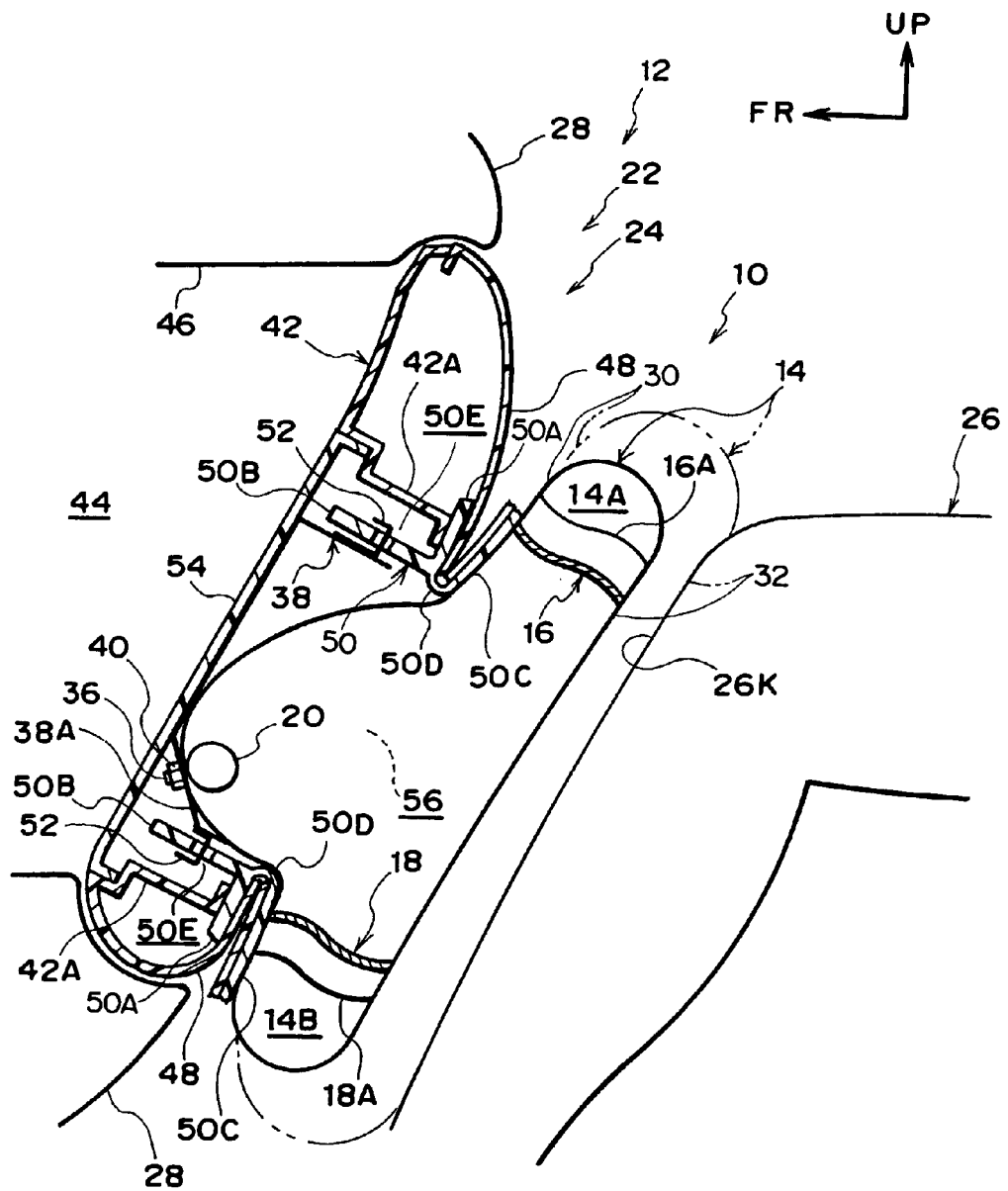
FIG. 1 is a cross-sectional view showing a state in which a knee portion of an occupant of a regular body type is restrained by a knee airbag due to the knee airbag expanding and deploying to the side of the knee portion of the occupant from within a glove box door at the time of a collision of a vehicle.

Exemplary embodiments of the present invention will be explained below based on the drawings. In FIG. 1 to FIG. 4, a knee airbag device for a vehicle 10 according to the present exemplary embodiment is a knee airbag device that is provided to correspond to a passenger seat (unillustrated) of a vehicle 12 and comprises a knee airbag 14, upper and lower tethers 16 and 18, and an inflator 20.

Figure 2:
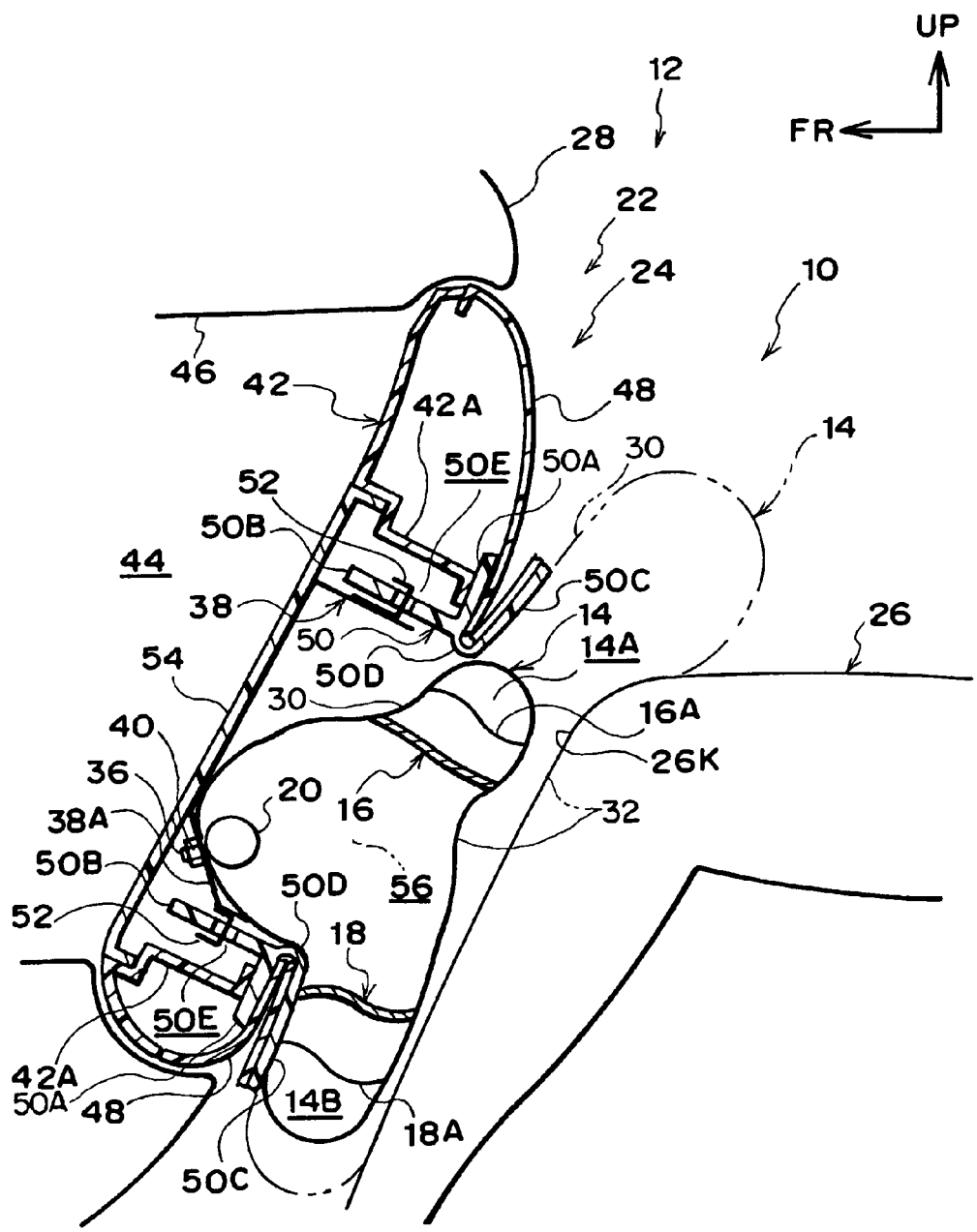
FIG. 2 is a cross-sectional view showing a state in which a knee portion of an occupant of a comparatively small body type is restrained by the knee airbag due to the knee airbag expanding and deploying to the side of the knee portion of the occupant from within the glove box door at the time of a collision of the vehicle.

The knee airbag 14 is arranged, for example, at a glove box door 24 configuring an occupant side outer wall of a glove box 22 of the vehicle, is placed in a folded-up state before a collision, and is configured to be able to receive a supply of gas from the inflator 20 and expand and deploy toward the side of a knee portion 26K of an occupant 26 at the time of a collision of the vehicle. As shown in FIG. 1 and FIG. 2, the knee airbag 14 comprises an instrument panel side foundation cloth 30 that is positioned at a side of an instrument panel 28 and an occupant side foundation cloth 32 that is positioned at the side of the occupant 26, at the time of expansion and deployment, and the instrument panel side foundation cloth 30 and the occupant side foundation cloth 32 are linked by the upper and lower tethers 16 and 18.

In FIG. 1 to FIG. 4, the upper and lower tethers 16 and 18 are each provided to extend in a vehicle width direction at the inside of the knee air bag 14, arranged to be separated from each other in a vehicle vertical direction, configured to be able to regulate a bag thickness of the knee airbag 14 at the time of expansion and deployment, and formed so that a vertical clearance therebetween increases approaching both vehicle width direction end portions 16A and 18A thereof. Before a collision, the tethers 16 and 18 are folded up and accommodated within the glove box door 24 together with the knee airbag 14.

Figure 3:
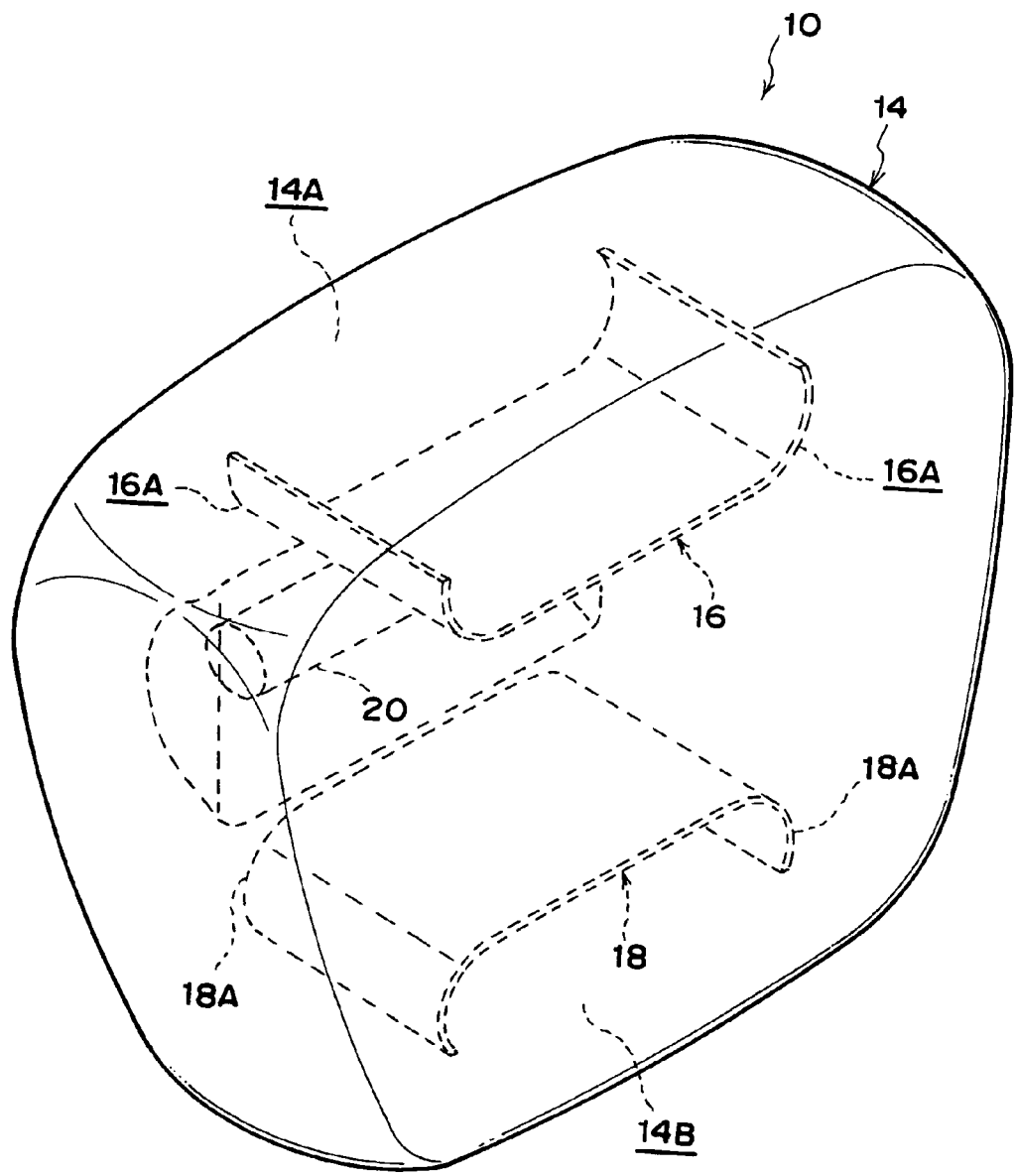
FIG. 3 is an enlarged perspective view showing the knee airbag in a deployed state.
Figure 4:
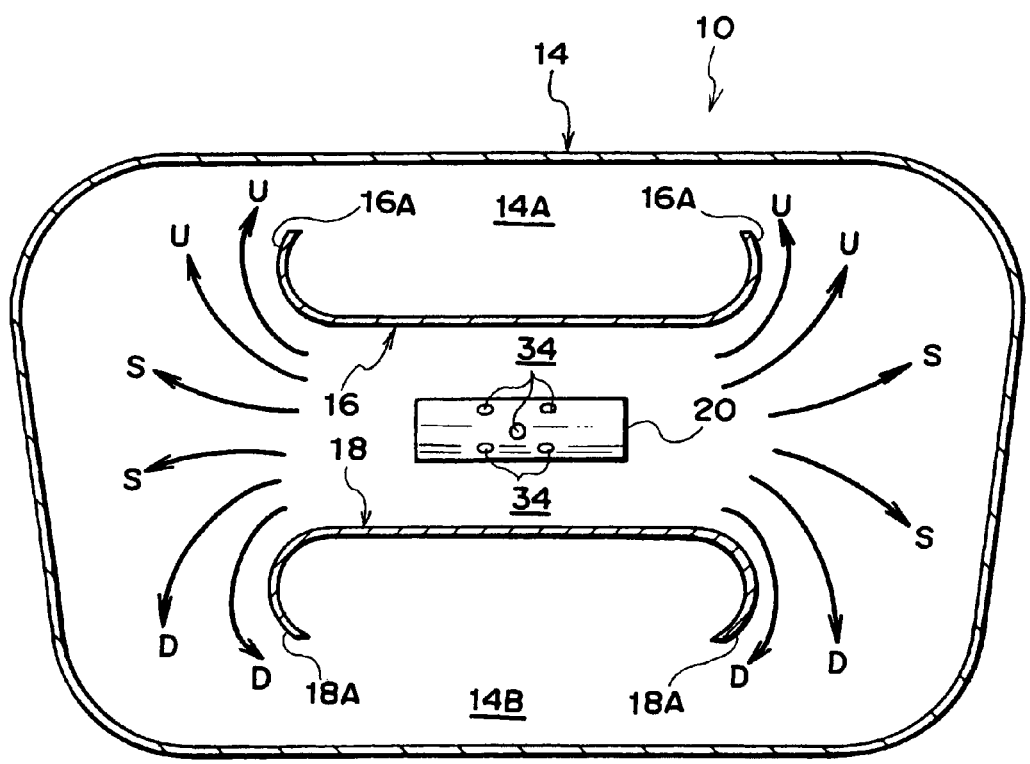
FIG. 4 is a cross-sectional view showing the knee airbag in the deployed state and the flow of gas from an inflator at the inside of the knee airbag.
Figure 5:
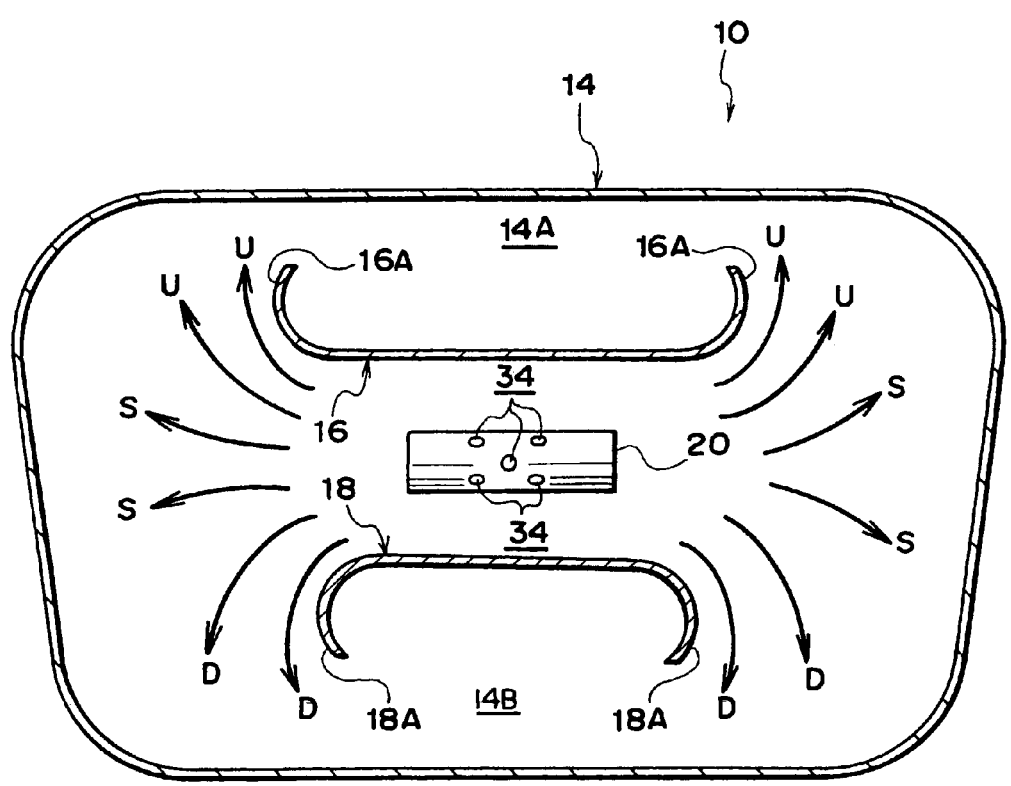
FIG. 5 is a cross-sectional view showing a case where a lower side tether is set to be shorter in a vehicle width direction than an upper side tether, and gas that has been supplied between the upper and lower tethers from the inflator flows into a lower portion of the knee airbag at a faster timing than it does into an upper portion, in accordance with a first modified example.

In the example shown in FIG. 3 and FIG. 4, both of the end portions 16A of the upper side tether 16 curve toward a vehicle upper side, and both of the end portions 18A of the lower side tether 18 curve toward a vehicle lower side. The curvature of both of the end portions 16A and 18A are set so that detachment is unlikely to occur at the time when gas that has been supplied between the upper and lower tethers 16 and 18 from the inflator 20 moves around into an upper portion 14A and a lower portion 14B of the knee airbag 14 from both of the end portions 16A and 18A.

In FIG. 1 to FIG. 4, the inflator 20 is configured to be able to eject gas to supply the gas between the upper and lower tethers 16 and 18 at the inside of the knee airbag 14 at the time of a collision of the vehicle 12. Specifically, the inflator 20 is arranged between the upper and lower tethers 16 and 18 at the inside of the knee airbag 14. As shown in FIG. 4, a gas ejection hole 34 which serves as an ejection opening for the gas at the time when the inflator has been operated is arranged, for example, at a substantial center portion of the knee airbag 14 in the vehicle width direction. The gas ejection hole 34 is provided, for example, at a diffuser (unillustrated) that is arranged to cover the inflator 20. As a result, even in the case of using a general inflator 20 comprising a gas ejection portion at one end thereof, gas can be supplied to the vehicle width direction substantial center portion between the upper and lower tethers 16 and 18 at the inside of the knee airbag 14.

The inflator 20 is connected to an airbag ECU (unillustrated) via a wire harness (unillustrated) and configured so as to be operated by operational current from the airbag ECU to supply gas for expansion to the knee airbag 14. The airbag ECU is configured so as to cause the operational current to flow to the inflator 20 at a time when a frontal collision of the vehicle has been determined according to a signal from a collision sensor (unillustrated).

As shown in FIG. 1 and FIG. 2, a stud bolt 36 is provided upright at the inflator 20, and by inserting the stud bolt 36 into an installation portion 38A of a metal module case 38 from a vehicle rear side and fastening a nut 40 with respect to the stud bolt 36 from a vehicle front side, the inflator 20 is fixed to the module case 38 together with the knee airbag 14. In order to secure installation space for the nut 40, the installation portion 38A of the module case 38 is configured as an inclined face that is separated from a cover 54 at an inner panel 42 side of the glove box door 24.

In this regard, to briefly explain the configuration of the glove box 22, in FIG. 1 and FIG. 2, the glove box 22 is incorporated and fixed at a position which is at a vehicle front side of the passenger seat, within the instrument panel 28 at the passenger seat side. The glove box 22 is configured comprising, for example, a main body 46 configuring a storage space 44 and the glove box door 24 configuring an occupant side outer wall. The main body 46 is configured as, for example, a box body that is open toward the vehicle rear side.

The glove box door 24 is a lid body, which combines an outer panel 48 positioned at the occupant side (vehicle rear side) when closed and an inner panel 42 positioned at a side opposite from the occupant (vehicle front side) when closed, and in which mounting space for the knee airbag 14 is secured at an interior thereof, and is installed at the instrument panel 28 side via a stud (unillustrated) provided a lower end portion thereof. The glove box door 24 is configured to be able to open and close with the stud as a center of rotation.

An airbag door member 50 is installed at an outer panel 48 side of the interior of the glove box door 24. The airbag door member 50 abuts an inner face (face at the vehicle front side) of the outer panel 48 at, for example, upper and lower base portions 50A. A pair of upper and lower vertical wall portions 50B are provided upright toward the inner panel 42, at the base portions 50A. Between the pair of upper and lower vertical wall portions 50B, for example, a pair of upper and lower door base members 50C are provided along an inner face of the outer panel 48. Between the pair of upper and lower door base members 50C, a tear line (unillustrated) is formed that can be torn by receiving expansion pressure of the knee airbag 14 of a predetermined value or greater. Further, hinge portions 50D that extend in the vehicle width direction are respectively formed at base portions of the pair of upper and lower vertical wall portions 50B. The door base members 50C are configured to be able to deploy respectively toward both of the vehicle upper side and the vehicle lower side with the hinge portions 50D as centers, after the tear line is cleaved by the expansion pressure of the knee airbag 14. Incidentally, it should be noted that a portion of the outer panel 48 is also configured to be cleaved and deployed, along with the deployment of the door base members 50C.

At the pair of upper and lower vertical wall portions 50B in the airbag door member 50, a plurality of locking holes 50E are respectively formed aligned along the vehicle width direction, and hooks 52 of the module case 38 are respectively locked in the locking holes 50E. As a result, the module case 38 is installed at the airbag door member 50.

Pressing members 42A for pressing the base portions 50A of the airbag door member 50 to the inner face of the outer panel 48 are provided at the inner panel 42 of the glove box door 24. The pressing members 42A are respectively provided at least at the vehicle upper side of the upper side vertical wall portion 50B and at the vehicle lower side of the lower side vertical wall portion 50B. The space between the upper and lower pressing members 42A at the inner panel 42 side is open for the purpose of installation of the module case 38 and is configured such that, after installation of the module case 38, a cover 54 is fit into the open portion.

Operation

The present exemplary embodiment is configured as described above, and the operation thereof will be explained below. In FIG. 1, in the knee airbag device for a vehicle 10 according to the present exemplary embodiment, when the vehicle 12 undergoes a frontal collision and the airbag ECU determines the occurrence of the collision based on a signal from the unillustrated collision sensor, operation current flows to the inflator 20 from the airbag ECU. The inflator 20 is operated by receiving the operation current and causes a large amount of gas to be ejected. Due to the gas being supplied to the knee airbag 14, the knee airbag 14 starts to expand and deploy.

At this time, the expansion pressure of the knee airbag 14 acts at the rear face (face at the vehicle front side) of the door base members 50C that are positioned closer to the outer panel 48 side than the knee airbag 14 at the inside of the glove box door 24. When this expansion pressure becomes equal to or greater than the predetermined value, the door base members 50C are torn and cleaved along the tear line (unillustrated). Further, along with this, a portion of the outer panel 48 is also cleaved. As a result, the door base members 50C and the portion of the outer panel 48 become an airbag door and deploy toward both of the vehicle upper side and the vehicle lower side, respectively, with the hinge portions 50D as centers, and an opening portion 56 is formed at the outer panel 48. The knee airbag 14 passes through the opening portion 56 and bulges to the side of the knee portion 26K of the occupant 26 from within the glove box door 24.

To explain the expansion and deployment of the knee airbag 14 in further detail, in FIG. 4, the gas that has been generated at the inflator 20 is ejected from the gas ejection hole 34 and supplied between the upper and lower tethers 16 and 18 at the inside of the knee airbag 14.

In this regard, the upper and lower tethers 16 and 18 are each provided to extend in the vehicle width direction at the inside of the knee air bag 14, arranged to be separated from each other in the vehicle vertical direction, and formed so that the vertical clearance therebetween increases approaching both vehicle width direction end portions 16A and 18A thereof. Further, both of the end portions 16A of the upper side tether 16 curve toward the vehicle upper side, and both of the end portions 18A of the lower side tether 18 curve toward the vehicle lower side.

Accordingly, the gas that has been supplied between the upper and lower tethers 16 and 18 spreads to both vehicle width direction sides (in the directions of arrows S) along the tethers 16 and 18 and further moves smoothly around into the upper portion 14A of the knee airbag 14 in the directions of arrows U from both of the end portions 16A of the upper side tether 16 and moves smoothly around into the lower portion 14B of the knee airbag 14 in the directions of arrows D from both of the end portions 18A of the lower side tether 18. As a result, the deployment of the knee airbag 14 in the vehicle vertical direction can be inhibited from lagging behind deployment in the vehicle width direction, and the knee airbag 14 can be caused to rapidly expand and deploy in both of the vehicle width direction and the vehicle vertical direction. Incidentally, it should be noted that the bag thickness of the knee airbag 14 at the time of completion of deployment is regulated by the tethers 16 and 18.

In this manner, in the knee airbag device for a vehicle 10 according to the present exemplary embodiment, while providing a structure which comprises the upper and lower tethers 16 and 18 that extend in the vehicle width direction and regulate the bag thickness of the knee airbag 14 and in which gas is supplied from the inflator 20 between the upper and lower tethers 16 and 18, the flow of gas to the upper portion 14A and the lower portion 14B from between the upper and lower tethers 16 and 18 at the inside of the knee airbag 14 can be made smoother, and the deployability of the knee airbag 14 in the vehicle vertical direction can be improved.

Further, as a result, the knee portion 26K can be appropriately restrained, not only in the case of the knee portion 26K of the occupant 26 having a regular body type as shown in FIG. 1, but also in a case where the body type of the occupant 26 is small and the height position of the knee portion 26K is low, or in a case where the knee portion 26K is close to the glove box door 24 serving as the knee airbag accommodation portion. In other words, it is possible to accommodate differences in the height position of the knee portion 26K due to the body type of the occupant 26. Incidentally, it should be noted that, in FIG. 1 and FIG. 2, the knee airbag 14 is shown by solid lines and double dashed lines, and the solid lines indicate a state during expansion and deployment, while the double dashed lines indicate a state in which the knee portion 26K of the occupant 26 is being restrained after completion of expansion and deployment.

Further, since the knee airbag 14 is folded up and accommodated within the glove box door 24 configuring the passenger side outer wall of the glove box 22 of the vehicle 12, the knee airbag 14 can be rapidly deployed between the knee portion 26K of the occupant 26 and the glove box door 24 at the time of a collision of the vehicle 12. As a result, the restraining ability with respect to the knee portion 26K of the occupant 26 can be further enhanced.

Modified Example 1

The configuration of the upper and lower tethers 16 and 18 is not limited to that which is described above and may be configurations such as shown in FIG. 2 and FIG. 5 to FIG. 8. First, to explain the modified example 1 shown in FIG. 5, in the modified example 1, the lower side tether 18 is set to be shorter in the vehicle width direction than the upper side tether 16. Incidentally, it should be noted that both of the end portions 16A of the tether 16 curve toward the vehicle upper side, and both of the end portions 18A of the lower side tether 18 curve toward the vehicle lower side, in the same manner as in the exemplary embodiment described above.

In the modified example 1, since the lower side tether 18 is set to be shorter in the vehicle width direction than the upper side tether 16, the gas that has been supplied between the upper and lower tethers 16 and 18 at the time of a collision of the vehicle 12 (refer to FIG. 1) flows into the lower portion 14B of the knee airbag 14 at a faster timing than it does into the upper portion 14A. Therefore, as shown in FIG. 2, the lower portion 14B of the knee airbag 14 can be caused to deploy even more rapidly compared with the case of FIG. 1. Furthermore, as a result, even in a case where a body type of the occupant 26 is small and the height position of the knee portion 26K thereof is low, or in a case where the knee portion 26K is close to the glove box door 24 serving as the knee airbag accommodation portion, the knee portion 26K can be appropriately restrained.

Incidentally, it should be noted that, in accordance with necessity, a configuration in which the upper side tether 16 is set to be shorter in the vehicle width direction than the lower side tether 18 is also possible.

Modified Example 2

Figure 6:
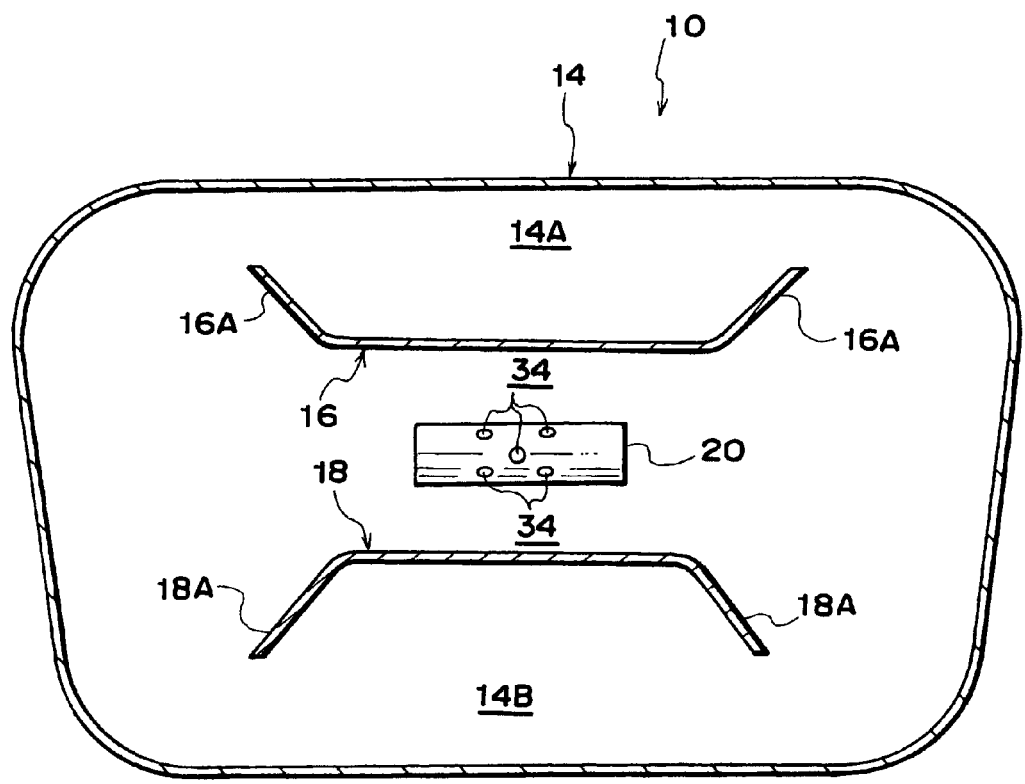
FIG. 6 is a cross-sectional view showing a structure in which both end portions of the upper side tether are inclined toward a vehicle upper side, and both end portions of the lower side tether are inclined toward a vehicle lower side, in accordance with a second modified example.

In the modified example 2 shown in FIG. 6, both of the end portions 16A of the upper side tether 16 incline toward the vehicle upper side, and both of the end portions 18A of the lower side tether 18 incline toward the vehicle lower side. Accordingly, in comparison with a conventional example in which the tethers extend to both of the end portions in a linear shape along the vehicle width direction, it is easy for the gas that has been supplied between the upper and lower tethers 16 and 18 to move around into the upper portion 14A and the lower portion 14B in the knee airbag 14. As a result, the flow of gas to the upper portion 14A and the lower portion 14B from between the upper and lower tethers 16 and 18 at the inside of the knee airbag 14 can be made smoother, and the deployability of the knee airbag 14 in the vehicle vertical direction can be improved, by way of a simple configuration.

Modified Example 3

Figure 7:
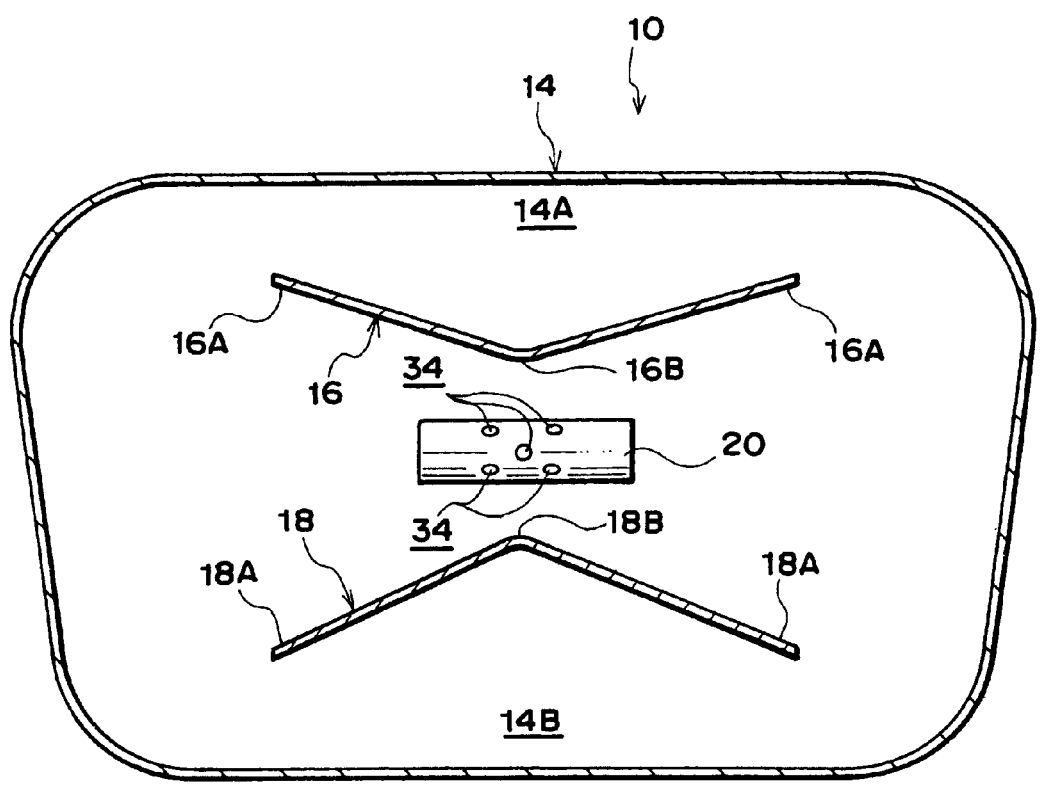
FIG. 7 is a cross-sectional view showing a structure in which the upper side tether is formed in a substantial V shape, and the lower side tether is formed in a substantial inverted V shape, in accordance with a third modified example.

In the modified example 3 shown in FIG. 7, the upper side tether 16 is formed in a substantial V shape, and the lower side tether 18 is formed in a substantial inverted V shape, when viewed from the vehicle front-rear direction. The tether 16 extends obliquely upward in a linear shape toward both of the end portions 16A, respectively, from a center portion 16B thereof in the vehicle width direction. Further, the lower side tether 18 extends obliquely downward in a linear shape toward both of the end portions 18A, respectively, from a center portion 18B thereof in the vehicle width direction. As a result, the vertical clearance between the tethers 16 and 18 is smallest at the center portions 16B and 18B and becomes larger approaching both of the end portions 16A and 18A.

In the modified example 3, since the upper side tether 16 is formed in a substantial V shape and the lower side tether 18 is formed in a substantial inverted V shape when viewed from the vehicle front-rear direction, when the gas that has been supplied between the upper and lower tethers 16 and 18 spreads in the vehicle width direction from the center portions 16B and 18B thereof along both of the end portions 16A and 18A, it also spreads immediately in the vehicle vertical direction. As a result, deployment of the knee airbag 14 in the vehicle vertical direction can be inhibited from lagging behind deployment in the vehicle width direction, and the knee airbag 14 can be caused to rapidly expand and deploy in both of the vehicle width direction and the vehicle vertical direction.

Modified Example 4

Figure 8:
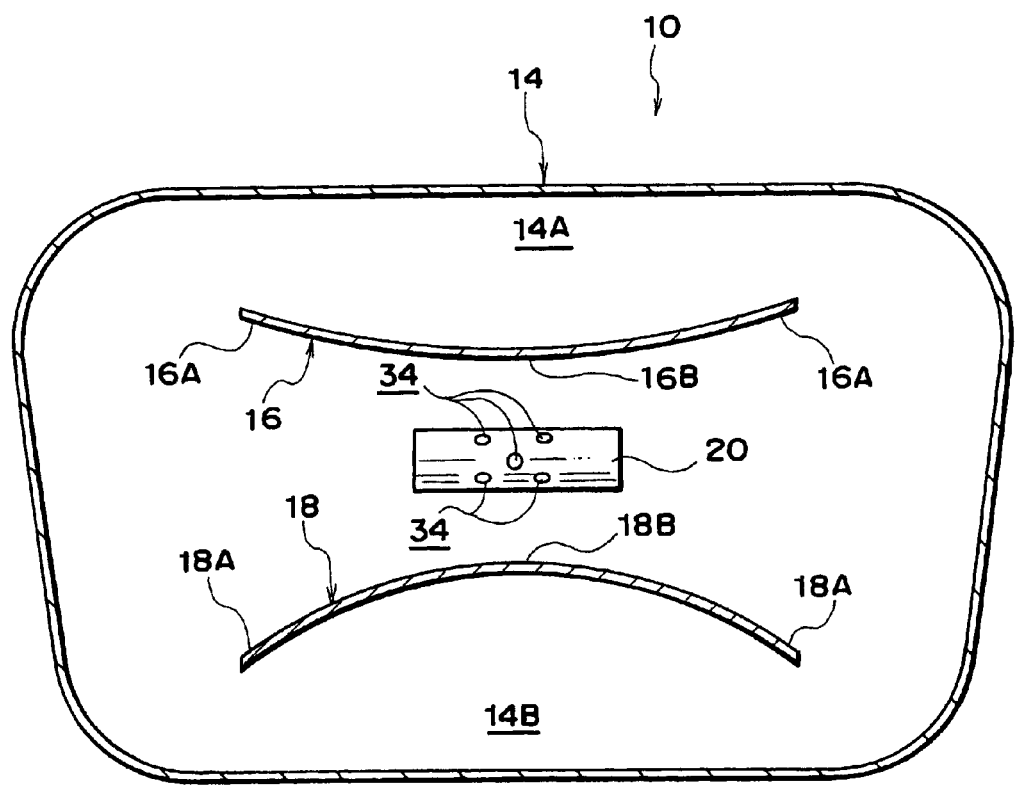
FIG. 8 is a cross-sectional view showing a structure in which the upper side tether has a curved shape that is convex at the vehicle lower side, across the entire length thereof in the vehicle width direction, and the lower side tether has a curved shape that is convex at the vehicle upper side, across the entire length thereof in the vehicle width direction, in accordance with a fourth modified example.

In the modified example 4 shown in FIG. 8, the upper side tether 16 has a curved shape that is convex at the vehicle lower side, across the entire length thereof in the vehicle width direction, and the lower side tether 18 has a curved shape that is convex at the vehicle upper side, across the entire length thereof in the vehicle width direction, when viewed from the vehicle front-rear direction. As a result, the vertical clearance between the tethers 16 and 18 is smallest at the vehicle width direction center portions 16B and 18B and becomes largest at both of the end portions 16A and 18A.

In the modified example 4, since the upper and lower tethers 16 and 18 each have a curved shape, when the gas that has been supplied between the upper and lower tethers 16 and 18 spreads in the vehicle width direction from the vehicle width direction center portions 16B and 18B thereof along both of the end portions 16A and 18A, it also spreads immediately in the vehicle vertical direction and smoothly moves around into the upper portion 14A and the lower portion 14B of the knee airbag 14, respectively. As a result, deployment of the knee airbag 14 in the vehicle vertical direction can be inhibited from lagging behind deployment in the vehicle width direction, and the knee airbag 14 can be caused to rapidly expand and deploy in both of the vehicle width direction and the vehicle vertical direction.

Other Modified Examples

In the configurations described above, the knee airbag 14 is folded up and accommodated within the glove box door 24, but the accommodation location of the knee airbag 14 is not limited to the glove box door 24. Further, the configurations of the respective portions within the glove box door 24 are not limited to the illustrated examples.

Further, in the illustrated examples, although the heights of the upper and lower tethers 16 and 18 that link the instrument panel side foundation cloth 30 and the occupant side foundation cloth 32 of the knee airbag 14 are drawn as being the same, the invention is not limited thereto, and, for example, a configuration may be provided in which the height of the upper side tether 16 is larger than the height of the lower side tether 18.

EXPLANATION OF THE REFERENCE NUMERALS

10 KNEE AIRBAG DEVICE FOR A VEHICLE
12 VEHICLE
14 KNEE AIRBAG
14A UPPER PORTION
14B LOWER PORTION
16 UPPER SIDE TETHER
16A BOTH END PORTIONS
16B CENTER PORTION
18 LOWER SIDE TETHER
18A BOTH END PORTIONS
18B CENTER PORTION
20 INFLATOR
22 GLOVE BOX
24 GLOVE BOX DOOR
26 PASSENGER
26K KNEE PORTION

The invention claimed is:

1. A knee airbag device for a vehicle, comprising:
   a knee airbag that is placed in a folded-up state before a collision and configured to be able to receive a supply of gas and expand and deploy toward the side of a knee portion of an occupant at the time of a collision of a vehicle;
   upper and lower tethers that are each provided to extend in a vehicle width direction at the inside of the knee air bag, arranged to be separated from each other in a vehicle vertical direction, configured to be able to regulate a bag thickness of the knee airbag at the time of expansion and deployment, and formed so that a vertical clearance therebetween increases approaching vehicle width direction end portions of both the upper and lower tethers; and
   an inflator that is able to eject gas to supply the gas between the upper and lower tethers at the inside of the knee airbag at the time of the collision of the vehicle,
   wherein both of the end portions of the upper side tether curve or incline toward a vehicle upper side, and both of the end portions of the lower side tether curve or incline toward a vehicle lower side.

2. The knee airbag device for a vehicle according to claim 1, wherein the lower side tether is set to be shorter in the vehicle width direction than the upper side tether.

3. The knee airbag device for a vehicle according to claim 1, wherein the upper side tether is formed in a substantial V shape, and the lower side tether is formed in a substantial inverted V shape.

4. The knee airbag device for a vehicle according to claim 3, wherein:
   the upper side tether extends obliquely upward in a linear shape from a center portion thereof in the vehicle width direction, toward each of both of the end portions thereof; and
   the lower side tether extends obliquely downward in a linear shape from a center portion thereof in the vehicle width direction, toward each of both of the end portions thereof.

5. The knee airbag device for a vehicle according to claim 1, wherein:
   the upper side tether has a curved shape that is convex at the vehicle lower side, across the entire length thereof in the vehicle width direction; and
   the lower side tether has a curved shape that is convex at the vehicle upper side, across the entire length thereof in the vehicle width direction.

6. The knee airbag device for a vehicle according to claim 1, wherein the knee airbag is folded up and accommodated within a glove box door constituting an occupant side outer wall of a glove box of the vehicle.

* * * * *